United States Patent Office 3,056,759
Patented Oct. 2, 1962

3,056,759
POLYPROPYLENE STABILIZED WITH DI-TERT.-OCTYL TRI- AND TETRASULFIDES
Philip L. Mercier, Plainfield, and Lawrence T. Eby, Linden, N.J., assignors to Esso Research and Engineering Company, a corporation of Delaware
No Drawing. Filed Aug. 21, 1958, Ser. No. 756,304
8 Claims. (Cl. 260—41)

This invention relates to an improved method of stabilizing polymers against thermal degradation. More particularly it relates to the prevention of thermal degradation in alpha olefin hydrocarbon polymers, prepared by the so-called low pressure process, by the utilization of particular dialkyl polysulfides.

The low pressure polymerization and copolymerization of alpha olefins and diolefins with catalyst systems made up of a partially reduced, heavy transition metal halide and a reducing metal-containing compound to high density, often isotactic, high molecular weight, solid, relatively linear products has been assuming ever increasing importance and is now well known.

These polymers are subject to the problem of thermal instability. Thermal degradation is manifested by a decrease in molecular weight of the polymer. This decrease can be determined by a number of ways such as solution viscosity, melt index, etc., which are related to the molecular weight.

It has now been found that thermal degradation of these alpha olefin polymers can be prevented and the polymers stabilized by incorporating in them small amounts of a dialkyl polysulfide selected from the group consisting of dialkyl trisulfides and dialkyl tetrasulfides.

It is surprising to find that the particular dialkyl polysulfides of this invention are so effective for the purpose since closely related sulfur-containing compounds such as β(T-octyl thio) ethanol and even very similar compounds such as dialkyl disulfides are much less effective.

The particular compounds of this invention are so efficient for the claimed purpose that the additional use of carbon black is not required. If desired, however, carbon black can also be incorporated to obtain additional benefits.

The polysulfides of this invention are utilized in an amount of 0.1 to 1 wt. percent based on the polymer and the carbon black, when employed, is utilized in an amount of 0.5 to 5 wt. percent based on the polymer. Mixtures of carbon blacks and polysulfides can be employed. These materials are incorporated into the polymer by conventional milling or extruding operations.

As stated, dialkyl trisulfides and dialkyl tetrasulfides can be employed for the purpose of this invention. The two alkyl components can be the same or different in the compounds utilized. Those compounds in which the alkyl components contain from 4 to 20 carbon atoms are preferred. Especially effective and desirable materials are di-tert. octyl trisulfide and di-tert, octyl tetrasulfide.

The alpha olefinic feeds utilized in polymerization and copolymerization include ethylene, propylene, butene-1, heptene-1, dodecene-1, etc. with propylene preferred.

Among the diolefins that can be used in copolymerization are butadiene, isoprene, piperylene, vinylcyclohexene, cyclopentadiene, 1,4-pentadiene, etc. It is to be understood that wherever the term "polymer" is used herein, it connotes both homo- and copolymers.

The actual process of preparing low pressure polymers is no part of this invention but is supplied for completeness. The process is described in the literature, e.g. see Belgian Patent 538,782 and "Scientific American," September 1957, pages 98 et seq.

In the process the polymers are prepared by polymerizing the constituent monomers in the desired proportions with the aid of certain polymerization catalysts, e.g. see above-mentioned Belgian patent. The catalysts are solid, insoluble reaction products obtained by partially reducing a reducible, heavy, transition metal halide of a group IV B–VI B or VIII metal with a reducing group I–III metal containing material such as an organometallic compound of an alkali, alkaline earth, rare earth metal or zinc. They can also be prepared by reducing an appropriate metal compound with the aid of metallic aluminum or a mixture of aluminum and titanium, etc. The preferred catalyst of this type is usually prepared by reducing 1 mole of titanium tetrahalide, usually tetrachloride, to the corresponding trivalent or sub-trivalent titanium halide with about 0.2 to 6 moles of aluminum triethyl, triisobutyl or other aluminum alkyl compound of the formula RR'AlX. In this formula, R, R' and X preferably are alkyl groups of 2 to 8 carbon atoms, although X may alternatively be hydrogen or a halogen, notably chlorine. The reduction is carried out by dissolving each of the two catalyst components in an inert solvent, preferably a $C_3$ to $C_{18}$ paraffin such as isopentane or n-heptane, and mixing the two solutions in the proper proportions at temperatures between 0° and 150° C. and in the absence of moisture, oxygen and sulfur impurities. The resulting precipitate in conjunction with some free aluminum alkyl compound is generally considered to constitute the actual active polymerization catalyst. Alternatively, it is possible to carry out the catalyst preparation using only about 0.3 to 0.8 mole of the aluminum alkyl compound per mole of titanium chloride, and then add a supplemental amount of the aluminum alkyl compound to the polymerization zone to raise the Al/Ti mole ratio therein to a value between about 1:1 and 3:1.

The monomers are then contacted with the resulting catalyst in the presence of the same or differing inert hydrocarbon solvent such as isopentane, n-heptane, xylene, etc. The polymerization is conveniently effected at temperatures of about 0° to 100° C. and pressures ranging from about 0 to 500 p.s.i.g., usually 0 to 100 p.s.i.g. The catalyst concentration in the polymerization zone is preferably in the range of about 0.1 to 0.5% based on total liquid and the polymer product concentration in the polymerization zone is preferably kept between about 2 to 15% based on total contents so as to allow easy handling of the polymerized mixture. The proper polymer concentration can be obtained by having enough of the inert diluent present or by stopping the polymerization short of 100% conversion, etc. When the desired degree of polymerization has been reached, a $C_1$ to $C_8$ alkanol such as isopropyl alcohol or n-butyl alcohol, desirably in combination with a chelating agent for deashing such as acetylacetone, is normally added to the reaction mixture for the purpose of dissolving and deactivating the catalyst and for precipitating the polymer product from solution. After filtration, the solid polymer may be further washed with alcohol or acid such as hydrochloric acid, dried, compacted and packaged.

The polymers produced have molecular weights in the range of about 50,000 to 300,000 or even as high as 3,000,000 as determined by the intrinsic viscosity method using the I. Harris Correlation (J. Polymer Science, 8,361, 1952). The polymers can have a high degree of crystallinity and a low solubility in n-heptane.

It is to be understood that the term "low pressure" polymer as used herein connotes material prepared in the indicated manner.

This invention and its advantages will be better understood by reference to the following examples.

EXAMPLE 1

Various formulations of identical low pressure polypropylene, prepared by using a reduced TiCl$_4$ catalyst, were made up utilizing various quantities of additives as indicated. In some cases carbon blacks of commercial grade, i.e. Spheron 6, a channel black and P-33, a furnace black, were also incorporated. These formulations were then tested to determine thermal failure at 250° F. The term "Hours to Failure" as used in Table I is the time that the polymer samples were subjected to heating in an air oven at 250° F. before showing a sudden decrease in tensile strength.

The details are shown below in Table I.

Table I

STABILIZATION AGAINST THERMAL DEGRADATION

| Carbon Black | Inhibitor | Hours to Failure at 250° F. |
|---|---|---|
| 1. None | trace N-lauroyl p-amino phenol | between 400–500. |
| 2. 3% Spheron 6 | do | 400. |
| 3. 3% P-33 | 0.1% (T-octyl thio) ethanol | between 400–600. |
| 4. None | 0.1% di-tert. octyl trisulfide | 1,200. |
| 5. None | 0.1% di-tert. octyl tetrasulfide | 1,200. |
| 6. 3% P-33 | 0.1% di-tert. octyl trisulfide | 1,500. |
| 7. 3% Spheron 6 | do | (1) |
| 8. 3% Spheron 6 | 0.1% di-tert. octyl tetrasulfide | (1) |

1 No failure or change in original tensile and elongation up to 1500 hrs. at 250° F.

These results show that formulations containing conventional antioxidants alone (Test 1), with carbon black (Test 2) and with related sulfur containing compounds (Test 3), all failed between 400 and 600 hours. Contrariwise, formulations (Tests 4 and 5) containing the compounds of this invention did not fail until 1200 hours. Tests 6 through 8 shown that formulations of the compounds of this invention plus carbon blacks failed at a minimum of 1500 hours and in some cases there were no failures up to 1500 hours, the conclusion of the testing period.

EXAMPLE 2

Additional formulations were prepared utilizing low pressure polypropylene as previously indicated and combinations of a closely related sulfur-containing compound, di-tert. octyl disulfide, with and without carbon black, and a compound of this invention with and without carbon black. The specific concentrations in weight percent are shown in Table II.

Table II

|  | 1 | 2 | 3 | 4 |
|---|---|---|---|---|
| Di-tert. octyl disulfide | 0.1 |  | 0.1 |  |
| Di-tert. octyl tetrasulfide |  | 0.1 |  | 0.1 |
| Vulcan 9 |  |  | 3.0 | 3.0 |

These formulations were then tested for melt index in grams/10 min. at 250° C. (cf. ASTM D-1238-52T) after holding at 250° C. for 8 minutes. This is a measure of thermal stability since melt index varies in an inverse manner with molecular weight. The test results were as follows:

| Formulation: | Melt index |
|---|---|
| 3 | 9.4 |
| 1 | 7.1 |
| 2 | 2.3 |
| 4 | 2.0 |

These results demonstrate the marked superiority of the di-tert. octyl tetrasulfide compound of this invention as compared to the corresponding disulfide, both with and without carbon black.

The advantages of this invention will be apparent to those skilled in the art. Thermal degradation in polymers is prevented in an efficient and economic manner.

It is to be understood that this invention is not limited to the specific examples which have been offered merely as illustrations and that modifications may be made without departing from the spirit of the invention.

What is claimed is:

1. A method of stabilizing against thermal degradation a polypropylene, solid hydrocarbon polymer prepared in the presence of a catalyst containing a partially reduced, heavy, transition metal halide which comprises incorporating in the polymer, in an amount of from 0.1 to 1 wt. percent based on the polymer, a dialkyl polysulfide selected from the group consisting of di-tert.-octyl trisulfide and di-tert.-octyl tetrasulfide.

2. The method of claim 1 in which carbon black, in an amount of 0.5 to 5 weight percent based on the polymer, is additionally incorporated into the polymer.

3. The method of claim 1 in which the dialkyl polysulfide is di-tert.-octyl trisulfide.

4. The method of claim 1 in which the dialkyl polysulfide is di-tert.-octyl tetrasulfide.

5. A composition of matter comprising a solid polypropylene, low pressure polymer prepared by utilizing a partially reduced, heavy, transition metal halide, admixed with from 0.1 to 1 wt. percent based on the polymer of a dialkyl polysulfide selected from the group consisting of di-tert.-octyl trisulfide and di-tert.-octyl tetrasulfide.

6. The composition of claim 5 in which carbon black, in an amount of 0.5 to 5 weight percent based on the polymer, is also admixed with the polymer.

7. The composition of claim 5 in which the dialkyl trisulfide is di-tert.-octyl trisulfide.

8. The composition of claim 5 in which the dialkyl trisulfide is di-tert.-octyl tetrasulfide.

References Cited in the file of this patent

UNITED STATES PATENTS

| 2,512,459 | Hamilton | June 20, 1950 |
| 2,643,241 | Crouch et al. | June 23, 1953 |
| 2,731,453 | Field et al. | Jan. 17, 1956 |
| 2,843,577 | Friedlander et al. | July 15, 1958 |
| 2,967,847 | Hawkins et al. | Jan. 10, 1961 |